April 18, 1944.                J. B. CHAMBERLAIN                2,347,148

BRAILLE TYPE

Filed June 4, 1942

Inventor
Joseph B. Chamberlain

By Ralph Burch
Attorney

Patented Apr. 18, 1944

2,347,148

UNITED STATES PATENT OFFICE 2,347,148

BRAILLE TYPE

Joseph B. Chamberlain, Kensington, Md., assignor to Baltimore Type and Composition Corporation, Baltimore, Md., a corporation of Delaware Application June 4, 1942, Serial No. 445,768

6 Claims. (Cl. 101—28)

This invention relates to improvements in Braille embossing or printing types and particularly to the methods of assembling the type characters.

In the Braille system of embossed writing the characters are formed by the use of the sixty-three possible combinations of six dots arranged in a group, or cell, each dot being known by a number. The conventional assortment of Braille embossing type with its bewildering array of similar characters requires a large and consequently expensive case, thus making it impracticable for use by the student, the voluntary transcriber, or the blind compositor. It is an object of the present invention to provide a type and method of assembling the type characters, which will permit all the Braille characters to be formed from a small case requiring not more than three different elements to form each type character, thus enabling the novice, the transcriber, or the blind compositor to easily and readily compose the type to form any and all of the Braille characters.

A further object of the invention resides in providing type composed of two or three elements having the dots arranged thereon so that when the elements are placed in a vertical stack the various characters can be easily formed.

Another object of the invention resides in interposing a table between the dots and type shoulder, which ordinarily absorbs a large portion of the pressure applied when the sheet is embossed, so that the table and not the shoulder contacts the sheet and permits a variation of the pressure to make the desired impression.

Other objects and advantages of the invention will be apparent during the course of the following description.

In the accompanying drawing forming a part of this specification and in which like numerals are employed to designate like parts throughout the same, Fig. 1 represents the various arrangements of dots to form the letters of the Braille alphabet, Fig. 2 shows the dots arranged in a cell with the number applied to each dot, Fig. 3 is a top plan view of the three elements arranged in separate relation, Figs. 4 and 5 are top plan views of type characters formed by different arrangements of the elements, Figs. 6 to 12, inclusive, represent in top plan double elements forming the first seven primary signs of the Braille system which may be used in combination with a single element to form all the alphabet characters, Figs. 13 to 17, inclusive, show the double and single elements in combination to form some of the alphabet characters.

Fig. 18 is a side elevation of a type showing the conventional manner of casting the dot on the shoulder thereof, and Fig. 19 is a similar view showing my improved method of casting the dot on the type shoulder.

In the drawing, wherein for the purpose of illustration I have shown a preferred embodiment of my invention, the general arrangement of the six dots in a group, or cell, to form characters of the Braille system is shown in Fig. 2, with the usual numbers applied to each of the dots. By various arrangements of one or more of the dots in the cell it is possible to form any one of the Braille characters. My improved type is composed of three elements 10, 11, and 12, which when arranged in a vertical stack, as shown in Figs. 4 and 5, form a complete type character. The elements are of oblong rectangular shape in cross section, and on the type shoulder of the element 10 a single dot 13 is cast slightly to one side of the center of the shoulder, while the type shoulder of the element 11 is provided with two dots 14 approximately one-twelfth of an inch apart from their centers and the type shoulder of element 12 is blank. The dots of the elements 10 and 11 are disposed nearer the center of the type shoulder than the ends so as to leave a relatively wide space at the ends, which serves to properly space the characters of the type apart when printed. The Braille characters may be formed by a combination of any three of the elements 10, 11, and 12 which are arranged in a vertical stack to form a complete character.

The other characters of the Braille system are developed from the first ten primary characters shown in Fig. 1, which are formed from the four upper dots of the cell, and, therefore, I propose to make type elements 15, shown in Figs. 6 to 12, inclusive, double the size of the elements 10, 11, and 12, having dots 13 and 14 arranged on their type shoulder to correspond to the first ten primary characters of the alphabet. As shown in Figs. 13 to 17, inclusive, any of the type elements 15 may be combined with one of the elements 10, 11 or 12 to form one of the Braille characters. By employing the double type elements considerable time can be saved in assembling the characters, but it is to be understood that the same characters can be formed by combining the single type elements 10, 11, and 12.

In Fig. 18 I have illustrated a conventional Braille type 16 having a dot 17 cast on the type body in the usual manner, and it will be observed the dot protrudes directly from the type shoulder with the sides substantially at right angles to the shoulder. This construction is faulty in that the sheet being embossed does not readily conform to the sharp angle between the dot and type shoulder and frequently results in the sheet being ruptured. To obviate this objection I cast the dots 13 and 14 on a concentric table 18, so that the dot is elevated above the type shoulder, as shown in Fig. 19, and a fillet 19 is formed at the jointure between the dot and table which eliminates the sharp angle between the dot and its base. By elevating the dot above the type shoulder and mounting the dot on the table 18, the table and not the type shoulder contacts the sheet, when the sheet is embossed, which permits a variation of pressure to make the desired impression.

It is to be understood that the form of my invention herein shown and described is to be taken as a preferred example of the same, and that certain changes in the shape, size, and arrangement of the parts may be made without departing from the spirit of the invention or the scope of the subjoined claims.

Having thus described my invention, I claim:

1. A Braille embossing type composed of not more than three elements arranged in a vertical stack, some of said elements having dots or projections on their type shoulder, said dots being placed adjacent to the transverse medial line of the shoulder and others being blank.

2. A Braille embossing type composed of three elements arranged in a vertical stack, some of said elements having dots or projections on their type shoulder, said dots being placed adjacent to the transverse medial line of the shoulder and others being blank.

3. A Braille embossing type in three sections adapted to be arranged in a vertical stack, one or more of said sections having dots or projections on their type shoulder, said dots being placed adjacent to the transverse medial line of the shoulder.

4. A Braille embossing type composed of two sections, one section being twice the size of the other section, said sections having a dot or dots protruding from their type shoulder adjacent the transverse medial line thereof.

5. A Braille embossing type composed of sections arranged in a vertical stack, one or more of said sections having dots or projections on their type shoulder, the dots being disposed nearer the transverse medial line of the type shoulder than its ends.

6. A Braille embossing type having an elevated table on its type shoulder from which the dots project, and a fillet formed at the jointure between the dots and the table.

JOSEPH B. CHAMBERLAIN.